US012609998B2

(12) United States Patent
Yu et al.

(10) Patent No.: US 12,609,998 B2
(45) Date of Patent: Apr. 21, 2026

(54) OPERATION MANAGEMENT METHOD FOR NETWORK DEVICE WITHOUT ADDRESS INFORMATION, AND NETWORK DEVICE

(71) Applicant: Beijing Beidou Hongpeng Techology Co. Ltd., Beijing (CN)

(72) Inventors: Hong Yu, Beijing (CN); Xintong Liu, Beijing (CN); Nana Ren, Beijing (CN)

(73) Assignee: Beijing Beidou Hongpeng Techology Co. Ltd., Beijing (CN)

( * ) Notice: Subject to any disclaimer, the term of this patent is extended or adjusted under 35 U.S.C. 154(b) by 445 days.

(21) Appl. No.: 17/822,120

(22) Filed: Aug. 24, 2022

(65) Prior Publication Data

US 2022/0407947 A1    Dec. 22, 2022

(51) Int. Cl.
H04L 69/165 (2022.01)
H04L 9/40 (2022.01)
H04L 43/10 (2022.01)

(52) U.S. Cl.
CPC ............ H04L 69/165 (2013.01); H04L 43/10 (2013.01); H04L 63/20 (2013.01)

(58) Field of Classification Search
None
See application file for complete search history.

(56) References Cited

U.S. PATENT DOCUMENTS

| | | | | |
|---|---|---|---|---|
| 9,036,481 B1 * | 5/2015 | White | ..................... | H04L 47/18 |
| | | | | 370/235 |
| 10,911,532 B1 * | 2/2021 | Zhang | ................... | H04L 67/148 |
| 11,184,191 B1 * | 11/2021 | Indiradevi | ............. | H04L 43/028 |

(Continued)

FOREIGN PATENT DOCUMENTS

| | | |
|---|---|---|
| CN | 101064625 A | 10/2007 |
| CN | 106413127 A | 2/2017 |

(Continued)

OTHER PUBLICATIONS

First Office Action, periodicals and search report issued on May 10, 2022 for counterpart Chinese patent application No. 202010112630. 3, along with the English translation.

(Continued)

*Primary Examiner* — Adnan Baig

(74) *Attorney, Agent, or Firm* — Getech Law LLC; Jun Ye

(57) ABSTRACT

The present disclosure discloses an operation management method for a network device without address information, which includes: recognizing an address of a front-end terminal; constructing a standard UDP/TCP data packet according to the address and session state information; and sending the standard UDP/TCP data packet. In another aspect, a network device without address information is claimed, which includes: a recognizing module configured to recognize an address of a front-end terminal; a data packet generating module configured to construct a standard UDP/TCP data packet according to the address and session state information; and a sending module configured to send the standard UDP/TCP data packet. The method and device described above can reduce the workload of network renovation while minimizing renovation costs, thereby maximizing cost effectiveness. Thus, any technical breakthrough in this direction is regarded as the direction of development.

9 Claims, 3 Drawing Sheets

(56)  References Cited

U.S. PATENT DOCUMENTS

| 2005/0007964 A1* | 1/2005 | Falco | H04L 67/104 |
| | | | 370/256 |
| 2007/0199061 A1* | 8/2007 | Byres | H04L 41/0806 |
| | | | 726/11 |
| 2013/0003653 A1* | 1/2013 | Adams | H04L 65/1073 |
| | | | 370/328 |
| 2014/0247713 A1* | 9/2014 | Krishnamurthy | H04L 49/30 |
| | | | 370/230 |
| 2015/0222540 A1* | 8/2015 | Unnimadhavan | H04L 45/74 |
| | | | 709/224 |
| 2015/0242481 A1* | 8/2015 | Hasegawa | G06F 16/951 |
| | | | 707/623 |
| 2017/0346787 A1* | 11/2017 | Menon | H04L 45/38 |
| 2019/0245856 A1* | 8/2019 | Irwan | H04L 9/0643 |
| 2019/0372936 A1* | 12/2019 | Sullenberger | H04L 63/164 |
| 2020/0045546 A1* | 2/2020 | Zhou | H04L 61/2514 |
| 2020/0266905 A1* | 8/2020 | Wang | H04W 40/12 |
| 2021/0234800 A1* | 7/2021 | Sheldon | H04L 63/0272 |
| 2023/0237064 A1* | 7/2023 | Bao | G06F 16/258 |
| | | | 707/756 |

FOREIGN PATENT DOCUMENTS

| CN | 108429641 A | 8/2018 |
| CN | 110113337 A | 8/2019 |
| CN | 110798448 A | 2/2020 |
| CN | 110809065 A | 2/2020 |

OTHER PUBLICATIONS

Supplementary search report on May 5, 2022 for counterpart Chinese patent application 202010112630.3, along with the English translation.
CN202010112630.3—Second Office Action mailed on Dec. 13, 2022, 12 pages.

* cited by examiner recognize an address of a front-end terminal — S1 construct a standard UDP data packet according to the address and own state information — S2 send the standard UDP data packet — S3

OPERATION MANAGEMENT METHOD FOR NETWORK DEVICE WITHOUT ADDRESS INFORMATION, AND NETWORK DEVICE

TECHNICAL FIELD

The present disclosure belongs to the technical field of network device, and in particular relates to an operation management method for a network device without address information, and a network device.

BACKGROUND

With the progress of the times and the development of science and technology, network security is becoming increasingly important. In recent years, all walks of life have attached great importance to the construction of network security. Renovation costs and implementation complexity are particularly crucial when upgrading network security for network systems that have been in operation for many years. Considering the complexity and ease of use in network security renovation, transparent technologies are usually used more often. Transparently connecting network security devices to a network does not change the topological structure of the network, but can reduce the workload of network renovation, lower the implementation costs, and maximize the input-output ratio.

Those network security devices that are transparently connected often do not have IP addresses and do not change their networking to ensure the connectivity of network routes. Since the connected network security devices do not have IP addresses and cannot be managed directly, a dedicated management network is usually created separately in networking by using remaining interfaces, so as to achieve the purpose of management for network security devices. While this method can provide management and maintenance, the separate creation of the dedicated management network also increases the workload and investment costs. This is only equivalent to problem simplification, rather than problem solving.

SUMMARY

(I) Object of the Disclosure

An object of the present disclosure is to provide an operation management method for a network device without address information, and a network device, in order to solve the problem that a network device, when transparently connected to a network, cannot achieve normal connection and communication and cannot be managed remotely due to the absence of its IP and MAC addresses.

(II) Technical Solution

To solve the above-mentioned problem, a first aspect of the present disclosure provides an operation management method for a network device without address information, including:

recognizing an address of an initiator terminal based on a message from the initiator terminal located at a front end;

constructing a standard UDP/TCP data packet according to the recognized address of the initiator terminal and session state information, in the UDP/TCP data packet, the address of the initiator terminal being used as a network device address, and the session state information comprises an IP address of a management server as a target, routing gateway information, a communication port of the initiator terminal and a management server communication port; and sending the standard UDP/TCP data packet to the management server.

In some embodiments of the present disclosure, the sending the standard UDP/TCP data packet to the management server specifically includes: sending the standard UDP/TCP data packet to the management server in the form of a heartbeat packet at a preset period.

In some embodiments of the present disclosure, the preset period is 5 to 60 seconds.

In some embodiments of the present disclosure, the method further includes: acquiring a maintenance data packet from the management server, the maintenance data packet being constructed according to address information of the network device, the session state information in the UDP/TCP data packet and configuration information needing to be updated after the management server parses the standard UDP/TCP data packet and obtains the address information of the network device; and reading the configuration information in the maintenance data packet, and writing the configuration information in a storage unit.

In some embodiments of the present disclosure, the configuration information needing to be updated further includes security policy information, the security policy information including an operation performed based on a matching result between information in the maintenance data packet and the session state information recorded in a gateway device; and the method further includes: matching the information in the maintenance data packet and the session state information recorded in the network device, and executing a corresponding operation in the security policy information based on the matching result.

In some embodiments of the present disclosure, the operation performed based on the matching result between the information in the maintenance data packet and the session state information recorded in the gateway device includes: a passage permission operation in the case that the matching result is that the matching succeeds, a passage blocking operation in the case that the matching result is that the matching fails, and a data encryption operation in the case that the matching succeeds, the maintenance data packet includes encryption key information, and the session state information includes encryption key information, and these two pieces of encryption key information match.

In some embodiments of the present disclosure, the IP address of the management server, the routing gateway information and the management server communication port are preset in the network device.

According to another aspect of the present disclosure, provided is a maintenance method for a network device without addresses, including: acquiring a standard UDP/TCP data packet with network device address information, a network device address being obtained by filling in an address of an initiator terminal; parsing the standard UDP/TCP data packet to obtain the network device address information; constructing a maintenance data packet according to the network device address information, the maintenance data packet at least including an address of an initiator, an initiator communication port updated based on the number of transmissions, a management server address, and a management server communication port; and sending the maintenance data packet to the network device, the maintenance packet being configured for maintenance of the network device.

In some embodiments of the present disclosure, the maintenance data packet complies with format requirements of a heartbeat data packet.

The maintenance data packet further includes security policy information, the security policy information including an operation performed based on a matching result between information in the maintenance data packet and the session state information recorded by a gateway device; and the method further includes: matching the information in the maintenance data packet and the session state information recorded in the network device, and executing a corresponding operation in the security policy information based on the matching result.

In some embodiments of the present disclosure, the method further includes: in the case that it is determined that the network device needs to be managed remotely, actively sending an additional maintenance data packet to the network device, the maintenance data packet including updated configuration information, so that the network device may be able to store updated configuration based on the updated configuration information and perform corresponding processing.

In some embodiments of the present disclosure, the configuration information in the additional maintenance data packet includes one or more pieces of security policy information, network configuration information including an IP address and a port, and encryption key information.

According to yet another aspect of the present disclosure, provided is a network device without address information, including: a recognizing module configured to recognize an address of an initiator terminal based on a message from the initiator terminal located at a front end; a data packet generating module configured to construct a standard UDP/TCP data packet according to the recognized address of the initiator terminal and session state information, in the UDP/TCP data packet, the address of the initiator terminal being used as a network device address, and the session state information including an IP address of a management server as a target, routing gateway information, a communication port of the initiator terminal and a management server communication port; and a sending module configured to send the standard UDP/TCP data packet to the management server.

In some embodiments of the present disclosure, the sending module is specifically configured to: send the standard UDP/TCP data packet to the management server in the form of a heartbeat packet at a preset period.

In some embodiments of the present disclosure, the network device further includes: an acquiring module configured to acquire a maintenance data packet from the management server, the maintenance data packet being constructed according to address information of the network device, the session state information in the UDP/TCP data packet and configuration information needing to be updated after the management server parses the standard UDP/TCP data packet and obtains the address information of the network device; and a reading module configured to read configuration information in the maintenance data packet, and write the configuration information in a storage unit.

According to yet another aspect of the present disclosure, provided is a maintenance apparatus for a network device without addresses, including:

an acquiring module configured to acquire a standard UDP/TCP data packet with network device address information, a network device address being obtained by filling in an address of an initiator terminal; a parsing module configured to parse the standard UDP/TCP data packet to obtain the network device address information; a data packet generating module configured to a maintenance data packet according to the network device address information, the maintenance data packet at least includes an address of an initiator, an initiator communication port updated based on the number of transmissions, a management server address, and a management server communication port; and a sending module configured to send the maintenance data packet, the maintenance packet being configured for maintenance of the network device.

In some embodiments of the present disclosure, the maintenance data packet further includes security policy information, the security policy information including an operation performed based on a matching result between information in the maintenance data packet and the session state information recorded by a gateway device; and the maintenance apparatus for the network device further includes: a matching module which matches the information in the maintenance data packet and the session state information recorded in the network device, and executes a corresponding operation in the security policy information based on the matching result.

Further, the maintenance data packet complies with the format requirements of the standard ICMP data packet.

(III) Advantageous Effects

The above technical solution of the present disclosure has the following advantageous technical effects.

The operation management method and network device of the present disclosure can reduce the workload of network renovation while minimizing renovation costs, thereby maximizing cost effectiveness. Thus, any technical breakthrough in this direction is regarded as the direction of development. Transparent deployment of a network device can lower the risk of this device being discovered and detected in the network, and also reduce the likelihood that the transparent network device is attacked, intruded or cracked.

DESCRIPTION OF EMBODIMENTS

To make the objective, technical solution and advantages of the embodiment of the present disclosure clearer, the embodiment of the present disclosure will be further described in detail below in combination with the drawings. It shall be understood that these descriptions are exemplary only and are not intended to limit the scope of the present disclosure. Also, it should also be noted that in order to avoid unnecessarily obscuring the concept of the present disclosure due to unnecessarily details, only the structures and/or steps closely related to the solutions according to the present disclosure are described in the following description, and other details of well-known structures and techniques not so related to the present disclosure are omitted.

Apparently, the described embodiments are some, but not all, embodiments of the present disclosure. Based on the described embodiments of the present disclosure, all other embodiments attained by those ordinary skilled in this art without creative efforts all fall within the protection scope of the present disclosure.

In addition, the hereinafter-described technical features that are involved in different implementations of the present disclosure can be combined with each other as long as they do not conflict with each other.

Figure 1:
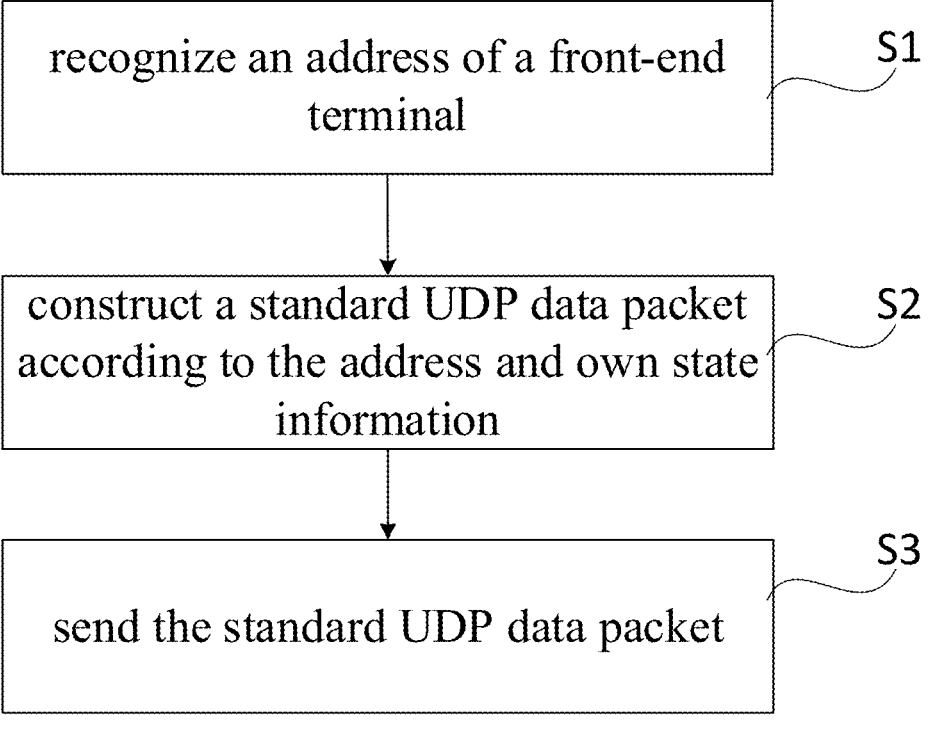
FIG. 1 is a flowchart of an operation management method for a network device without address information in accordance with a first implementation of the present disclosure.

As shown in FIG. 1, in a first aspect of the embodiments of the present disclosure, there is provided an operation management method for a network device without address information. The network device is a connected network security device, such as a gateway device, but is not limited to this. The method of the present disclosure will be described below by taking the gateway device as an example. The operation management method for the network device includes the following steps.

In step S1, an address of a front-end terminal is recognized.

The front-end terminal is an initiator host, and an address of the front-end terminal is an IP address and/or an MAC address of the initiator host. The following will take the IP address as an example for description.

Prior to sending a service request to a management platform, the initiator host may perform an ICMP test, that is, a link state is confirmed between the initiator host and the management platform (or also referred to as a management server) as a communication node through an ICMP data message. The link is connected if the ICMP data message is ping-connected, allowing a service request to be sent subsequently.

In the ICMP test, the ICMP data message will reach the management platform via the gateway device, and the management platform will also perform connection verification after receiving the message and allow the message to reach the initiator host via the gateway device. Therefore, in the ICMP test, the network device can acquire an initiator host address, an initiator host port and an address of the management platform, and the network device preferably records the acquired addresses, or may not record any address in the ICMP test.

In an embodiment of the present disclosure, upon the success in the ICMP test, the initiator host can initiate a service request to the management device, wherein the service request may carry information such as a source address (the initiator host address), a source communication port (an initiator host communication port), a destination address (a management platform address) and service request content. The service request must first pass through the gateway device.

In step S2, a standard user datagram protocol (UDP)/TCP data packet is constructed according to the recognized address of the front-end terminal and session state information.

As an example, the session state information refers to session state information of the initiator host itself, which may include: an IP address of the initiator host, an IP address of the management platform, routing gateway information, a communication port of an initiator and a communication port of the management platform. In addition, if data needs to be transmitted through a secret key, the session state information may further include communication secret key information of the management platform. The IP address of the initiator host, the communication port of the initiator and the IP address of the management platform may be acquired from a data packet from the initiator host, and the routing gateway information, the communication port of the management platform and communication secret key information (if any) of the management platform may be set in the gateway device in advance. In a preferred embodiment of the present disclosure, a list of trusted management devices or other network devices may be configured in the gateway device in advance, wherein information of each network device configured in the list may include an ID and IP address of the network device, routing gateway information, communication port and encryption key information (or encryption indication information), such that the gateway device can perform matching with data from the management platform based on these pieces of information, thereby processing the data packet accordingly based on a matching result.

Since the connected gateway device does not have IP address information, in an embodiment of the present disclosure, the gateway device may regard the IP address of the initiator host as an IP address of the network device itself.

A standard UDP or TCP data packet is generated based on the address information of the initiator host, as well as the IP address of the management platform, the routing gateway information, the communication port of the initiator, the communication port of the management platform, the communication secret key of the management platform (optional) and the like in the session state information. That is, the generated data packet contains an IP address of an IP address management platform of the initiator host, the routing gateway information, the communication port of the initiator, the communication port of the management platform, and the communication secret key (optional) of the management platform. The UDP/TCP data packet does not contain service information requested by the initiator host.

In step S3, the standard UDP/TCP data packet is sent.

Upon the generation of the standard UDP/TCP data packet, the gateway device sends the standard UDP/TCP data packet to the management platform.

According to the above method, in case that the network device is reachable, the address of the front-end terminal and other session state information are acquired by the gateway device and subsequently written into the UDP/TCP data packet. Following the first communication with the management platform, further, the management platform may parse the database to determine the address of the network device based on the address in the parsed data packet. Therefore, the management platform can monitor and simply manage the network device that is transparently connected to the network. This method can reduce the workload of network renovation while minimizing renovation costs, thereby maximizing cost effectiveness. Thus, any technical breakthrough in this direction is regarded as a direction of development.

Optionally, the sending the standard UDP/TCP data packet specifically includes: sending the standard UDP/TCP data packet in the form of a heartbeat packet at a preset period.

Optionally, the preset period is 5 to 60 seconds.

Optionally, the method further includes the following steps.

In step S4, a maintenance data packet from the management platform is acquired.

The maintenance data packet is constructed according to address information of the network device and configuration information to be updated after the address information of the network device is obtained from parsing of the standard UDP/TCP data packet by the management platform.

In an embodiment of the present disclosure, the maintenance data packet generated by the management platform may contain the following five-tuple information: network device address information (actually a source IP address, that is, the IP address of the initiator host), a network device port (actually a source port, that is, an initiator host port), a destination IP address (i.e., the IP address of the management platform), a destination port (i.e., the communication port of the management platform) and encryption key information, wherein the port information of the network device refers to updated port information which is acquired by adding a fixed value (such as adding 10) to the communication port of the initiator in the UDP/TCP data packet after each transmission, and belongs to configuration information to be updated; and the encryption key information may also be omitted based on actual needs. In this embodiment of the present disclosure, the present invention is also applicable if other configuration information to be updated exists.

Optionally, this data packet may be a standard data packet in the format of a heartbeat packet.

In an embodiment of the present disclosure, upon the reception of the maintenance data packet from the management platform, the information in the maintenance data packet may be matched with the recorded session state information, and corresponding processing is performed based on a matching result. For example, when it is determined that the information in the maintenance data packet does not match the recorded session state information, the gateway device may refuse to further send a data packet carrying an initiator's request to the management platform. The data packet carrying the initiator's request is further sent to the management platform only when it is determined that the information in the maintenance data packet matches the recorded session state information.

In other embodiments of the present disclosure, the maintenance data packet from the management platform may also carry security policy information (a policy payload). As an example, the policy payload is configured to give policies of operations corresponding to a matching result between the information in the maintenance data packet and the session state information recorded by the gateway device. The operations corresponding to the matching result may include: (1) a passage permission operation under a matched state; a passage stop operation under an unmatched state; and (3) a data encryption operation in the case that the information in the maintenance data packet matches the session state information, and the maintenance data packet and the session state information both contain matching encryption keys, wherein the scope of the data encryption operation may be specified in the policies or pre-agreed.

In other embodiments of the present disclosure, when the management platform confirms the need for remote online management on the gateway device, the management platform can actively send a maintenance data packet (an additional maintenance data packet) to the gateway device at any time, wherein the maintenance data packet at this time contains updated configuration information. The configuration information may include, for example, one or more of the following information: security policy information, network configuration information including IP addresses and ports, and encryption key information, etc., so that the gateway device stores the updated configuration information and performs corresponding processing.

In other embodiments of the present disclosure, in the case that the information in the maintenance packet is matched with five-tuple of the session state information, it is possible to allow partial information matching. In this case, a matching priority of each element in the five-tuple can be set, in order to perform matching based on the order of matching priorities from high to low. If a predetermined matching condition is met, the operation corresponding to this matching condition may be performed.

In addition, in some embodiments of the present disclosure, in the case that the matching result is to perform an encryption operation on data, the gateway device and the management platform can perform a secret key negotiation on an encryption algorithm under a control protocol. The secret key negotiation process can be implemented based on the existing process, and thus not described in detail in the present disclosure.

In step S5, the configuration information in the maintenance data packet is read, and written into a storage unit.

In some embodiments of the present disclosure, in the case that the maintenance data packet contains the configuration information, the gateway device reads the configuration information and writes it into an ROM.

In some embodiments of the present disclosure, in the case that the maintenance data packet contains security policy information, preferably, the gateway device also reads the security policy information and writes it into the ROM. A policy payload item (or referred to as a policy item for short) in the security policy information may be in a binary format. The gateway device can read the configuration information in the acquired maintenance data packet and write it into the ROM of the gateway device. For example, the configuration information may be composed of a policy header and a list of multiple policy items, wherein the number of policy items may be any value between 1 and 65535, and the total length of the entire policy should be less than 65535 bytes.

The management platform recognizes an address of an initiator terminal based on the UDP/TCP data packet and sends the configuration information to the front-end terminal (actually, received by the gateway device). The network device will read the maintenance data packet while recognizing the maintenance data packet sent from the management platform, and will receive and process the data packet if reading that the data packet is intended to be delivered to the initiator terminal, so as to manage messages; or it can be understood in a way that follows: A delivers a package to B, and when this package reaches a guard C, the guard C recognizes that it is destined for himself and then receives and processes it directly. This approach has the characteristic that there is no IP address for the guard C, but the guard C can perform policy distribution management. Despite its support information sending and receiving functions, the network device in the prior art needs to rely on its own IP address. The key point of the present disclosure is that the network device can manage the network device without an additional networking IP address, even in the absence of its IP address.

In another aspect of the embodiments of the present disclosure, there is further provided a maintenance method for a network device without addresses. This method may be implemented by a management platform (a server configured to perform a management). This method includes: acquiring a standard UDP/TCP data packet with network device address information, wherein the network device address is obtained by filling in an address of an initiator terminal; parsing the standard UDP/TCP data packet to obtain the network device address information; constructing a maintenance data packet according to the network device address information, wherein the maintenance data packet at least includes: an address of an initiator, an initiator communication port updated based on the number of transmissions, a management server address and a communication port of the management server; and sending the maintenance data packet, the maintenance data packet being configured for maintenance of the network device.

Optionally, the maintenance data packet complies with the format requirements of the standard heartbeat data packet.

In yet another aspect of the embodiments of the present disclosure, there is provided a network device without address information. The network device includes: a recognizing module configured to recognize an address of a front-end terminal; a data packet generating module configured to construct a standard UDP/TCP data packet according to the address and the session state information; and a sending module configured to send the standard UDP/TCP data packet.

Optionally, the sending module is specifically configured to: send the standard UDP/TCP data packet in the form of a heartbeat packet at a preset period.

Optionally, the network device further includes: an acquiring module configured to acquire a maintenance data packet from the management server, the maintenance data packet being constructed according to the address information of the network device, the session state information in the UDP/TCP data packet and configuration information to be updated after the address information of the network device is obtained from parsing of the standard UDP/TCP data packet by the management server; and a reading module configured to read the configuration information in the maintenance data packet, and write the configuration information into a storage unit.

In yet another aspect of the embodiments of the present disclosure, there is provided a maintenance apparatus for a network device without addresses. The maintenance apparatus includes: an acquiring module configured to acquire a standard UDP/TCP data packet with network device address information; a parsing module configured to parse the standard UDP/TCP data packet to obtain the network device address information; a data packet generating module configured to construct a heartbeat data packet according to the address information, and add configuration information for distributing policy modification into the heartbeat data packet, to obtain a maintenance data packet; and a sending module configured to send the maintenance data packet, the maintenance data packet being configured for maintenance of the network device.

Optionally, the maintenance data packet complies with the format requirements of the heartbeat data packet.

In some embodiments of the present disclosure, the configuration information to be updated further includes security policy information, which includes operations corresponding to a matching result between the information in the maintenance data packet and the session state information recorded by the gateway device. The network device further includes: a matching module configured to match the information in the maintenance data packet with the session state information recorded in the network device, and perform the corresponding operation in the security policy information based on a matching result.

Figure 2:
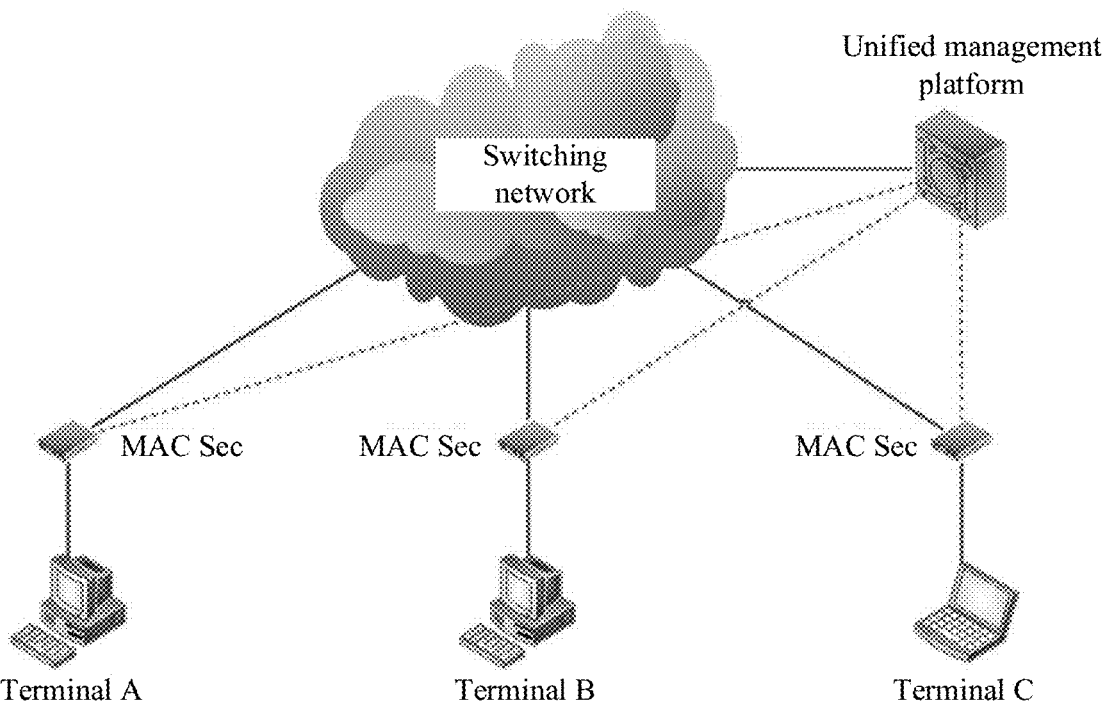
FIG. 2 is a schematic diagram of transparent connection of the network device to a network in accordance with an optional implementation of the present disclosure.

As shown in FIG. 2, in an optional embodiment of the present disclosure, there is provided a procedure in which a network device having no IP address is connect to a network after its deployment and is managed by a platform.

Environmental Conditions

Terminal A, Terminal B, Terminal C and a unified management platform (which may be implemented by installing management software on a general server) are interconnected on the network; the network devices (such as a gateway device, which may be expressed as MAC Sec in FIG. 2) are deployed in front of each terminal. The gateway device itself has no IP address and is connected in a transparent manner to the network shown in FIG. 2, for purposes of network connectivity testing. The conditions are satisfied if the testing is successful.

Figure 3:
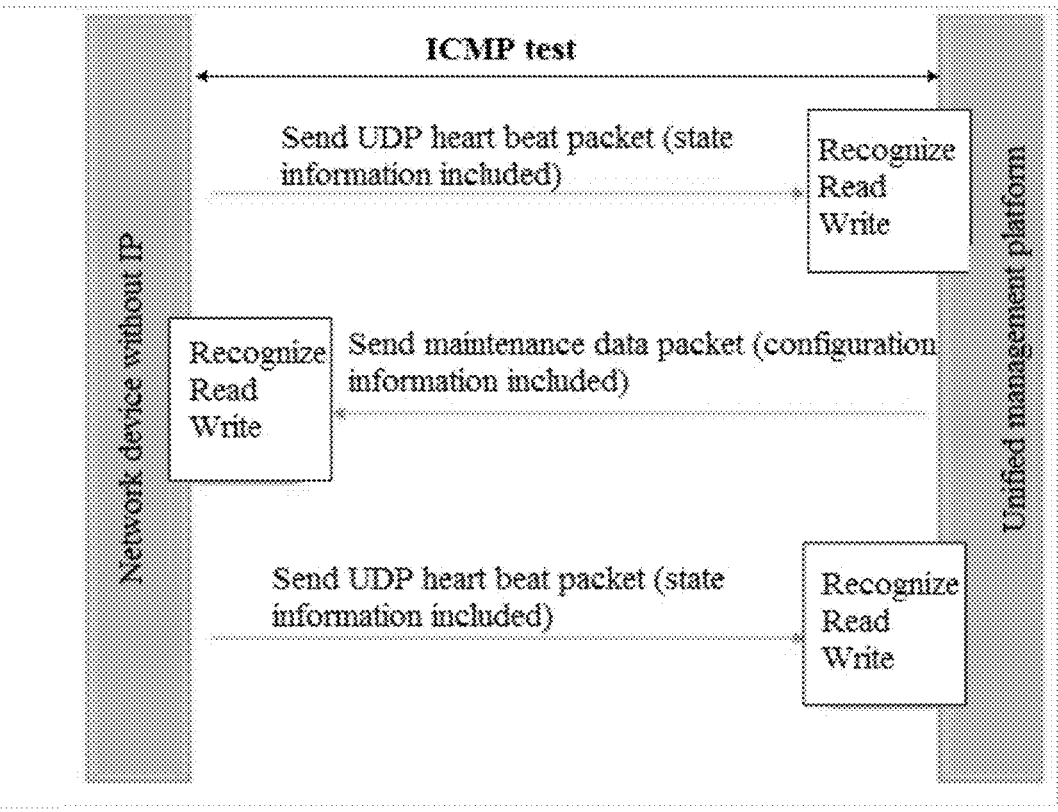
FIG. 3 is an interaction diagram of the network device and a platform in accordance with an optional implementation of the present disclosure.

The procedure of interaction processing is illustrated in FIG. 3, including:

1. The gateway device MAC Sec recognizes an IP address of its initiator terminal and uses this IP address for periodic heartbeat packet sending (for example, the period may be 10 seconds), i.e., sending the session state information to the unified management platform by constructing the standard UDP/TCP data packet, and reporting the online state of the device, etc.

2. Upon reception of the UDP/TCP heartbeat packet from the gateway device, the unified management platform disassembles, reads and displays the content of the heartbeat packet.

3. When maintenance is desired (i.e., management policy modification is distributed), a heartbeat data packet is constructed, wherein the heartbeat data packet contains source and destination IP addresses, source and destination port information, encryption information (optional), routing session information (optional), and the like. The heartbeat data packet is added with the configuration information for distributing policy modification in the case that new configuration information needs to be distributed, and it is ensured that the content of this data packet such as length, fields, etc. can be legally sent.

4. The gateway device MAC Sec recognizes the heartbeat data packet for reading, and then reads source and destination IP addresses, source and destination port information, encryption information (optional) and routing session information of the management platform. A gateway device proxy initiates an IP address, routing, and port session information of the terminal, and then communicates with the management platform. The gateway device writes the IP address, routing, and port session information of the initiator terminal into a flash cache for storage, which is convenient for a subsequent UTP/TCP protocol to use relevant address information, routing information, and port session information in a newly established channel.

5. The gateway device MAC Sec performs periodic heartbeat packet sending (for example, the period may be 10 seconds), i.e., sending the session state information to the unified management platform by constructing the standard UDP/TCP data packet, reporting the online state of the device, etc.

Upon reception of the heartbeat packet from the gateway device MAC Sec, the unified management platform disassembles, reads and displays the content of the heartbeat packet.

The present disclosure is intended to claim an operation management method for a network device without address information. The operation management method includes: recognizing an address of a front-end terminal; constructing a standard UDP/TCP data packet according to the address and session state information; and sending the standard UDP/TCP data packet. In another aspect, a network device without address information is claimed, which includes: a recognizing module configured to recognize an address of a front-end terminal; a data packet generating module configured to construct a standard UDP/TCP data packet according to the address and the session state information; and a sending module configured to send the standard UDP/TCP data packet.

The method and device described above have the following advantages.

1. In terms of basic use of network communication: the fundamental problem of insufficient network address resources in the entire network due to insufficient IP address resources is solved, the repeated use of basic network resources is innovatively solved, and the in-depth integration of network operation and maintenance management resources under the condition that the original environment remains unchanged is created.

2. In terms of basic use of internal network communication: the problem that IP address resources cannot be added or adjusted for online management of a dedicated network device because an internal network environment has been built is solved, and a heavy reliance on basic network communication without relying on internal address changes is created.

3. In terms of network management methods or management modes: the problem that in network operation and maintenance management, only a TCP protocol can be used for online remote configuration management without backup and multiplexing of a UTP protocol for online management is solved, and the backup capabilities of network management methods and modes are innovatively enhanced.

4. In terms of alleviating the shortage of network operation and maintenance service resources: the problem of on-site troubleshooting is solved for an engineer, the untimely problem of on-site configuration management is alleviated, the investment of transportation resources in supporting the access is reduced, the cost of travel time is greatly reduced, the problems such as insufficient abilities of technical personnel, and the like are alleviated, and a new form of network remote operation and maintenance services is created.

5. In terms of network security management: the risk that the device is attacked by various hacking tools is greatly reduced, and the ability of the device to protect against network security vulnerabilities and protection levels and other security protection capabilities of the device are enhanced, thereby innovatively laying the foundation for breakthroughs in network security management technologies.

The method and device described above can reduce the workload of network renovation while minimizing renovation costs, thereby maximizing cost effectiveness. It shall be appreciated that the above-mentioned specific implementations of the present disclosure are merely used to exemplify or explain the principles of the present disclosure, rather than limitations to the present disclosure. Therefore, any modifications, equivalent substitutions, improvements, etc. made without departing from the spirit and scope of the present disclosure shall be included within the protection scope of the present disclosure. Furthermore, the appended claims of the present disclosure are intended to cover all the variation and modification examples that fall within the scopes and boundaries of the appended claims, or the equivalents of such scopes and boundaries.

What is claimed is:

1. An operation management method for a network device without its own address, comprising:

recognizing an address of an initiator terminal based on a message from the initiator terminal located at a front end;

constructing a standard UDP/TCP data packet including an address of the network device and session state information, wherein the address of the network device is conducted to be the same as the address of the initiator terminal, and the session state information comprises an IP address of a management server as a target, routing gateway information, a communication port of the initiator terminal and a management server communication port; and sending the standard UDP/TCP data packet to the management server in the form of a heartbeat packet at a preset period;

acquiring a maintenance data packet from the management server, the maintenance data packet including the address of the network device, the IP address of the management server as a target, a communication port information of the network device, and the management sever communication port information, wherein the communication port information of the network device is information of updated communication port which is acquired by adding a fixed value to the communication port of the initiator in the UDP/TCP data packet after each transmission, serving as updated configuration information for the network device; and reading the configuration information in the maintenance data packet, and storing the configuration information in a storage unit so as to perform maintenance of the network device based on the stored configuration information;

wherein the configuration information comprises security policy information, the security policy information comprising an operation performed based on a matching result between the information in the maintenance data packet and the session state information recorded in the network device; and the method further comprising:

matching the information in the maintenance data packet and the session state information recorded in the network device, and executing a corresponding operation in the security policy information based on the matching result, wherein each element in the session state information is set with a matching priority.

2. The operation management method according to claim 1, wherein the preset period is 5 to 60 seconds.

3. The operation management method according to claim 1, wherein the operation performed based on the matching result between the information in the maintenance data packet and the session state information recorded in the network device comprises: a passage permission operation in the case that the matching result is that the matching succeeds, a passage blocking operation in the case that the matching result is that the matching fails, and a data encryption operation in the case that the matching succeeds, the maintenance data packet comprises encryption key information, the session state information comprises encryption key information, and these two pieces of encryption key information match.

4. The operation management method according to claim 1, wherein the IP address of the management server, the routing gateway information and the management server communication port are preset in the network device.

5. A maintenance method for a network device without its own addresses, comprising:

acquiring a standard UDP/TCP data packet including an address of the network device and session state information, wherein the address of the network device is obtained by filling in an address of an initiator terminal carried in a message from an initiator terminal located at the front end of the network device, the UDP/TCP data packet complies with format requirements of a heartbeat data packet, and the session state information comprises an IP address of a management server as a target, routing gateway information, a communication port of the initiator terminal and a management server communication port;

parsing the standard UDP/TCP data packet to obtain the address of the network device;

constructing a maintenance data packet according to the address of the network device, the session state information in the UDP/TCP data packet and updated configuration information, the maintenance data packet at least comprising the address of the network device, communication port information of the network device updated based on the number of transmissions, a management server address, and a management server communication port information, wherein the communication port information of the network device is information of updated communication port which is acquired by adding a fixed value to the communication port of the initiator in the UDP/TCP data packet after each transmission; and sending the maintenance data packet, the maintenance data packet being configured for maintenance of the network device;

wherein the maintenance data packet further comprises security policy information, the security policy information comprising an operation performed based on a matching result between information in the maintenance data packet and the session state information recorded in the network device; and the method further comprises:

matching the information in the maintenance data packet and the session state information recorded in the network device, and executing a corresponding operation in the security policy information based on the matching result, wherein each element in the session state information is set with a matching priority.

6. The maintenance method according to claim 5, wherein the maintenance data packet complies with format requirements of a heartbeat data packet.

7. The maintenance method according to claim 5, further comprising:

in the case that it is determined that the network device needs to be managed remotely, actively sending an additional maintenance data packet to the network device, the maintenance data packet comprising updated configuration information, so that the network device may be able to store updated configuration based on the updated configuration information and perform corresponding processing.

8. The maintenance method according to claim 7, wherein the configuration information in the additional maintenance data packet comprises one or more pieces of security policy information, network configuration information comprising an IP address and a port, and encryption key information.

9. The operation management method according to claim 1, wherein the step of recognizing an address of an initiator terminal based on a message from the initiator terminal located at a front end comprises:

recognizing an address of an initiator terminal based on a ICMP data message from the initiator terminal located at a front end.

* * * * *